United States Patent
Shimizu

[11] Patent Number: 5,984,658
[45] Date of Patent: Nov. 16, 1999

[54] THIN SHEET FORMING ROLL, SHEET FORMING MACHINE, AND SHEET FORMING METHOD

[75] Inventor: Akira Shimizu, Sagamihara, Japan

[73] Assignee: Modern Machinery Co., Ltd., Kanagawa, Japan

[21] Appl. No.: 08/930,349

[22] PCT Filed: Jan. 17, 1997

[86] PCT No.: PCT/JP97/00070

§ 371 Date: Sep. 30, 1997

§ 102(e) Date: Sep. 30, 1997

[87] PCT Pub. No.: WO97/28950

PCT Pub. Date: Aug. 14, 1997

[30] Foreign Application Priority Data

Feb. 9, 1996 [JP] Japan ..................................... 8-23586

[51] Int. Cl.[6] .................................................. B29C 43/46
[52] U.S. Cl. ......................... 425/327; 425/363; 425/368
[58] Field of Search ..................................... 425/363, 384, 425/368, 373, 374, 327; 165/89, 90; 264/175

[56] References Cited

U.S. PATENT DOCUMENTS

| | | | |
|---|---|---|---|
| 242,058 | 5/1881 | Schurmann . | |
| 3,625,280 | 12/1971 | Peter | 165/90 |
| 4,071,081 | 1/1978 | Chielens et al. | 165/90 |
| 4,158,128 | 6/1979 | Evdokimov et al. | 219/469 |
| 4,233,011 | 11/1980 | Bolender et al. | 425/363 |
| 4,252,184 | 2/1981 | Appel | 165/90 |
| 4,440,214 | 4/1984 | Wedel | 165/90 |
| 4,823,450 | 4/1989 | Ramisch et al. | 29/116.2 |
| 5,240,666 | 8/1993 | Schnyder et al. | 425/363 |
| 5,567,448 | 10/1996 | Frankland | 425/363 |

FOREIGN PATENT DOCUMENTS

| | | |
|---|---|---|
| 0165 750 A2 | 12/1985 | European Pat. Off. . |
| WO 92/19809 | 11/1992 | WIPO . |

OTHER PUBLICATIONS

Supplementary European Search Report—dated Dec. 11, 1998—EP 97 90–0429.

*Primary Examiner*—James P. Mackey
*Attorney, Agent, or Firm*—Sughrue, Mion, Zinn, Macpeak & Seas, PLLC

[57] ABSTRACT

A thin sheet forming roll includes a metallic elastic external cylinder (102) comprising a metal tube capable of elastic deformation, a shaft portion (103) for closing both ends of the metallic elastic external cylinder (102), and a cooling fluid (104) filled under an internal pressure into the metallic elastic external cylinder (102). When a melt resin from a die of an extruder is pinched between the roll and an opposite roll, that part of the metallic elastic external cylinder (102) which is pressed against the melt resin changes into a shape adapted to the outer diameter of the opposite roll, because the metal tube of the metallic elastic external cylinder (102) is elastically deformable against the pressure of the cooling fluid. Thus, a smooth thin sheet free from bank marks is formed.

8 Claims, 18 Drawing Sheets

101 SHEET FORMING ROLL
102 METALLIC ELASTIC EXTERNAL CYLINDER
103 SHAFT PORTION
104 FLUID
110 ANNULAR SEAL MEMBER
111 ELASTIC ROLL
112 BEARING
113 INTERNAL CYLINDER
114 ELASTIC MATERIAL

101 SHEET FORMING ROLL
102 METALLIC ELASTIC EXTERNAL CYLINDER
103 SHAFT PORTION
104 FLUID
106 O-RING

- 12   DIE
- 17   MELT RESIN
- 18   THIN SHEET
- 101  SHEET FORMING ROLL
- 105  METALLIC ROLL

17 MELT RESIN
102 METALLIC ELASTIC EXTERNAL CYLINDER
104 FLUID
105 METALLIC ROLL

- 101 SHEET FORMING ROLL
- 102 METALLIC ELASTIC EXTERNAL CYLINDER
- 103 SHAFT PORTION
- 104 FLUID
- 110 ANNULAR SEAL MEMBER
- 111 ELASTIC ROLL
- 112 BEARING
- 113 INTERNAL CYLINDER
- 114 ELASTIC MATERIAL

17  MELT RESIN
102 METALLIC ELASTIC EXTERNAL CYLINDER
105 METALLIC ROLL
111 ELASTIC ROLL

THIN SHEET FORMING ROLL, SHEET FORMING MACHINE, AND SHEET FORMING METHOD

TECHNICAL FIELD

This invention relates to a thin sheet forming roll, a sheet forming machine, and a sheet forming method each of which efficiently forms a thin sheet with uniform surface smoothness.

BACKGROUND ART

FIG. 18 shows the outline of a sheet forming machine for forming a sheet of a thermoplastic resin.

In FIG. 18, the numeral 11 denotes an extruder, 12 a die, 13 to 15 metallic rolls, and 16 a cutter.

As shown in this drawing, a melt resin 17 extruded from the die 12 of the extruder 11 is guided to the plurality of metallic rolls 13 to 15. Both surfaces of the melt resin 17 are pinched and cooled by the surfaces of the rolls, whereby the melt resin 17 is formed into a thin sheet 18. Then, the thin sheet 18 is cut to predetermined lengths by the cutter 16, or if desired, taken up by a winding device (not shown).

It is well known that when the melt resin 17 from the die 12 is pinched by the above resin forming machine into the thin sheet 18, sheet formation takes place while a bank is occurring at the nip between the rolls.

With earlier technologies, when the thin sheet 18 having a relatively large thickness (say, 300 $\mu$m or more) is to be obtained, it is relatively easy to control the bank to make it uniform widthwise. A thick melt resin has some cushioning effect. Even if the bank is slightly nonuniform widthwise, therefore, the thick melt resin can be pinched over its entire width by the surfaces of the rolls nearly uniformly. As a result, a smooth sheet can be formed.

When the thin sheet 18 having a very small thickness of, say, about 200 $\mu$m is to be formed by the rigid metallic rolls 13 and 14, on the other hand, the cushioning properties of the melt resin 17 are low. Thus, those parts of the melt resin 17 which have a bank are pressed against the surfaces of the metallic rolls, while bank-free parts are not pressed against the surfaces of the metallic rolls. Consequently, the sheet surface becomes uneven partially in the width direction.

The earlier technologies, therefore, have proposed that the surface of one of the metallic rolls be formed of an elastic material such as rubber so that the elastic force of the elastic material prevents a bank mark from occurring during sheet formation.

However, the surface of the elastic material such as rubber cannot be made a mirror surface similar to that of the metallic roll, thus causing unsatisfactory surface smoothness to the thin sheet.

Another problem is that a transparent sheet which must have mirror surfaces as both surfaces cannot be formed.

An additional proposal has been made of one of the metallic rolls which is a mirror finished roll covered with a metal tube outside of the elastic material (see Japanese Laid-Open Patent Publication Nos. 124425/90 and 100960/95).

The above-described proposal is intended to obtain a thin resin sheet having excellent surface smoothness. For this purpose, the melt resin to be formed into a thin sheet is pressed under the elastic force of the elastic material layer (e.g. rubber), disposed inside of the metallic tube, such that the elasticity accommodates the uneven thickness of the melt resin.

PROBLEMS TO BE SOLVED BY THE INVENTION

The conventional method of forming a sheet with satisfactory smoothness by using an elastic material such as rubber, however, involves the following problem: The elastic material such as rubber is a heat insulating material. Thus, even when cooled with cooling water or the like from inside or outside the roll, the elastic material such as rubber undergoes minimal cooling effect. Conversely, the surface of the rubber becomes hot under the heat of the melt resin, making satisfactory sheet formation impossible.

The roll covered with a metallic tube outside of the elastic material also poses the problem that the cooling efficiency of the elastic material is so low that the outer surface of the metal tube needs to be directly cooled with cooling water.

Furthermore, the equipment becomes upsized and complicated, the efficiency of cooling is not very high, and it is difficult to drain the surface of the metal tube completely.

The present invention has been accomplished in the light of the foregoing problems. Its object is to provide a thin sheet forming roll, a sheet forming machine, and a sheet forming method each of which facilitates temperature control for cooling, and which can form a thin sheet with satisfactory surface smoothness.

DISCLOSURE OF THE INVENTION

A first thin sheet forming roll of the present invention which solves the above-described problems is a sheet forming roll for forming a thin sheet by pinching a thermoplastic resin between at least two rolls while cooling it. This sheet forming roll comprises a metallic elastic external cylinder comprising a metal tube capable of elastic deformation, and a shaft portion for closing both ends of the metallic elastic external cylinder.

According to this first thin sheet forming roll, a melt resin from a die of an extruder is pinched using the sheet forming roll having the external cylinder comprising the metal tube capable of elastic deformation. When the melt resin is pinched, the metallic elastic external cylinder changes into a shape adapted to the uneven thickness, if any, of the melt resin, because the metal tube of the external cylinder is elastically deformable. While so changing in shape, the metallic elastic external cylinder is pressed against the melt resin. Thus, a surface-smoothed uniform thin sheet free from bank marks can be formed.

A second thin sheet forming roll of the present invention is a thin sheet forming roll for forming a thin sheet by pinching a thermoplastic resin between at least two rolls while cooling it. This thin sheet forming roll comprises a metallic elastic external cylinder comprising a metal tube capable of elastic deformation, a shaft portion for closing both ends of the metallic elastic external cylinder, and an elastic roll capable of elastic deformation and rotation disposed inside the metallic elastic external cylinder.

According to this second thin sheet forming roll, a melt resin from a die of an extruder is pinched using the sheet forming roll having the external cylinder comprising the metal tube capable of elastic deformation, and the elastic roll capable of rotation disposed inside the external cylinder. When the melt resin is pinched, the metallic elastic external cylinder changes into a shape adapted to the uneven thickness, if any, of the melt resin, because the metal tube of the external cylinder and the elastic roll inside the external cylinder are elastically deformable. While so changing in shape, the metallic elastic external cylinder is pressed against the melt resin. Thus, a surface-smoothed uniform thin sheet free from bank marks can be formed.

A third thin sheet forming roll of the present invention is the first or second thin sheet forming roll having annular seal members capable of elastic deformation provided on the outer periphery of the shaft portion so as to fit into both ends of the metallic elastic external cylinder and over the shaft portion in a watertight condition.

By providing such annular seal members, deformation of both ends of the metallic elastic external cylinder is permitted by the annular seal members. The amount of the deformation becomes uniform throughout the surface of the roll in the axial direction, including both ends thereof. Thus, a thin sheet with better surface smoothness can be formed.

A fourth thin sheet forming roll of the present invention is any of the first to third thin sheet forming rolls each including a cooling fluid pressure feeding means for feeding a cooling fluid under pressure into the metallic elastic external cylinder via the shaft portion.

By providing such a cooling fluid pressure feeding means, a predetermined internal pressure can be imparted to the metallic elastic external cylinder, the cooling efficiency can be improved, and appropriate cooling at a desired temperature can be performed.

A fifth and a sixth thin sheet forming roll of the present invention are each any of the first to fourth thin sheet forming rolls in which the metallic elastic external cylinder has a seamless structure without welded seams.

The seamless structure permits the formation of a satisfactory sheet having no welded seams transferred thereto during pinching of the melt resin.

A seventh thin sheet forming roll of the present invention is any of the first to sixth thin sheet forming rolls in which the metallic elastic external cylinder comprises at least two metallic tubes fitted together.

By constructing the metallic elastic external cylinder from the at least two metallic tubes fitted together, the thickness of each tube can be decreased, thus prolonging life in the presence of repeated deformation.

An eighth thin sheet forming roll of the present invention is the first thin sheet forming roll including an internal cylinder of a smaller outer diameter than the inner diameter of the external cylinder so that a cooling fluid is filled under an internal pressure into the space between the internal cylinder and the external cylinder.

By disposing such an internal cylinder, it suffices to fill the fluid under the internal pressure into the space between the external cylinder and the internal cylinder, and to simply flow a cooling fluid into the interior of the internal cylinder. There is no need to provide the aforementioned dedicated fluid pressure feeding means outside of the roll to apply an internal pressure.

A ninth thin sheet forming roll of the present invention is the eighth thin sheet forming roll including a cooling fluid feeding means for feeding a cooling fluid into the internal cylinder.

By providing the cooling fluid feeding means, the cooling fluid can be fed by a separate line without application of a high pressure.

A first thin sheet forming machine of the present invention is a thermoplastic resin sheet forming machine for guiding a melt resin, extruded from a die of an extruder, to at least two metal rolls, and pinching both surfaces of the melt resin between the surfaces of the rolls, while cooling the melt resin, to form a thin sheet; wherein at least one of the metal rolls is any one of the first to ninth thin sheet forming rolls.

According to this invention thin sheet forming machine, a melt resin extruded from a die of an extruder is guided between the metallic elastic external cylinder and a metallic roll, the metallic elastic external cylinder comprising the elastically deformable metal tube, being filled with a cooling fluid and having self-restoring properties. Then, the melt resin is pinched between the metallic elastic external cylinder and the metallic roll, while being cooled, to form a thin sheet with satisfactory surface smoothness.

A second thin sheet forming machine of the present invention is the first thin sheet forming machine wherein any one of the first to ninth sheet forming rolls is longer in the axial direction than an opposite metallic roll.

Because of this constitution, the pinching pressure on the melt resin becomes more uniform throughout the forming roll, thus giving a thin resin sheet having high surface smoothness.

A third thin sheet forming machine of the present invention is the above thin sheet forming machine wherein the sheet forming roll and the opposite metallic roll are driven by a drive means to pinch the melt resin therebetween.

Compared with drag by the opposite metallic roll, this pinching of the melt resin by the sheet forming roll and the opposite metallic roll causes little torsion or deformation between the parts in contact with the melt resin and the parts not in contact with the melt resin. Thus, a stable thin resin sheet can be formed with the use of a thinner metallic elastic external cylinder.

A thin sheet forming method of the present invention comprises guiding a melt resin extruded from a die of an extruder into the nip between any of the first to ninth sheet forming rolls and a metallic roll, and pinching the melt resin between the sheet forming roll and the metallic roll, with cooling, to form a mirror-surfaced thin sheet.

BEST MODE FOR CARRYING OUT THE INVENTION

Embodiments of the present invention will now be described with reference to the accompanying drawings.

First Embodiment

Figure 1:
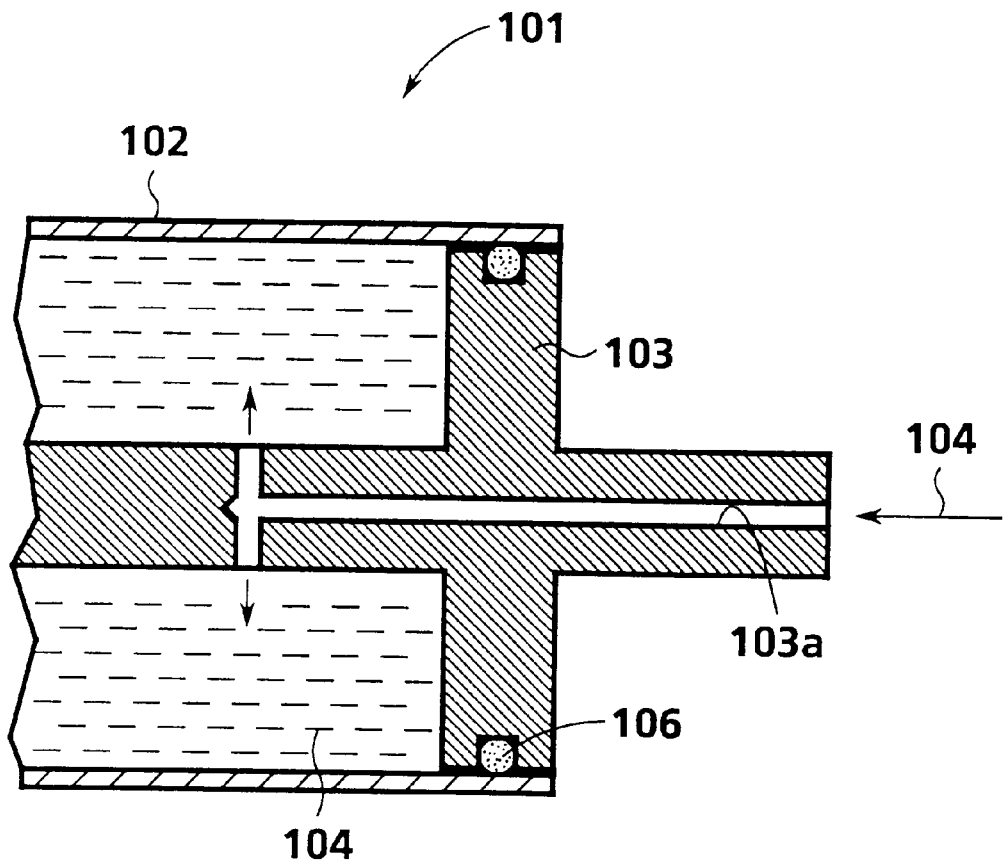
FIG. 1 is a schematic sectional view of a sheet forming roll concerned with a first embodiment of the present invention.
Figure 18:
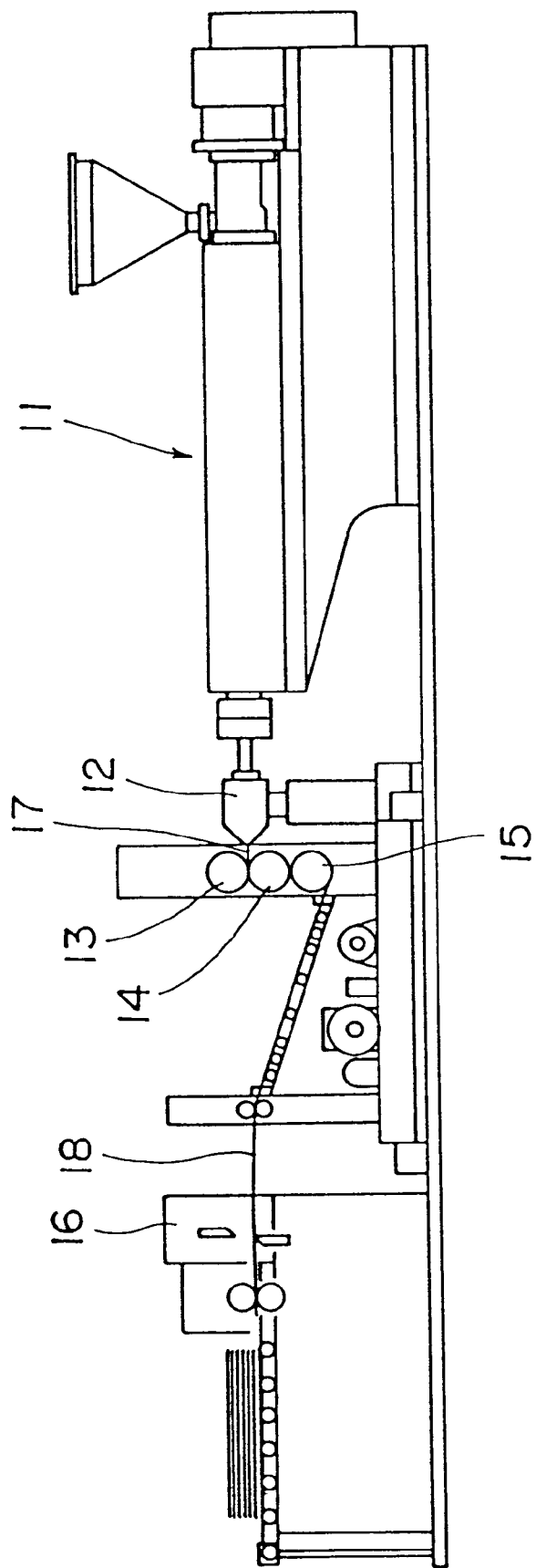
FIG. 18 is a schematic sectional view of a sheet forming machine.

FIG. 1 is a schematic view of a sheet forming roll concerned with the present invention for use in a sheet forming machine as illustrated in FIG. 18.

As shown in FIG. 1, a thin sheet forming roll 101 concerned with the present invention (hereinafter referred to as the sheet forming roll) is composed of a metallic elastic external cylinder 102 thick enough to be elastically deformable, a shaft portion 103 for closing both ends of the metallic elastic external cylinder 102, and a cooling fluid pressure feeding means (not shown) for pressure feeding a fluid 104, introduced from the outside via the shaft portion 103 of the metallic elastic external cylinder 102, into the external cylinder 102 to impart a predetermined pressure to the external cylinder 102.

Figure 2:
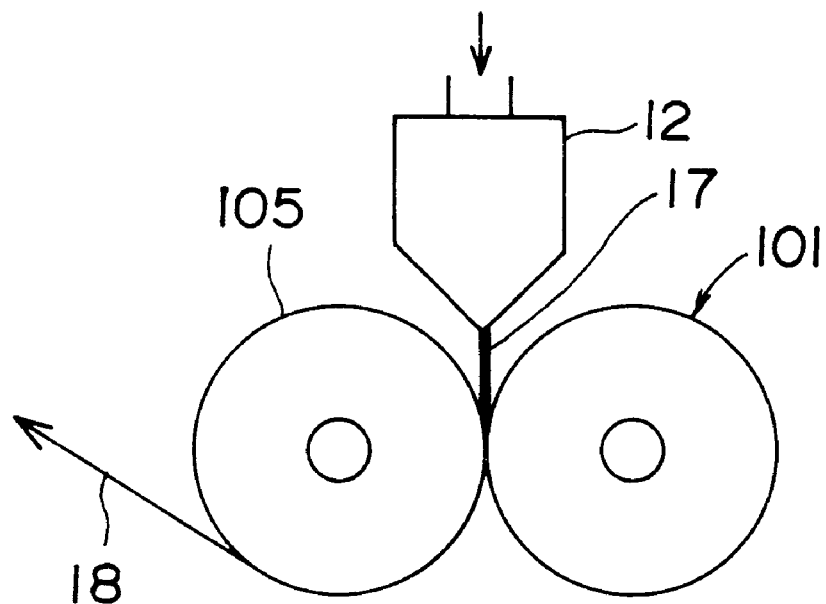
FIG. 2 is a schematic view of sheet formation concerned with the first embodiment of the present invention.

FIG. 2 shows the outline of a forming portion using the sheet forming roll concerned with the present invention.

In FIG. 2, a metallic roll 105 having a smooth surface similar to a conventional roll is disposed opposite the sheet forming roll 101. The metallic roll 105 and the sheet forming roll 101 pinch a melt resin 17 from a die 12 to form a thin sheet 18.

Instead of the metallic roll 105, another sheet forming roll 101 may be opposed to the sheet forming roll 101.

In the illustrated embodiment, the opposed rolls 101, 105 are exemplified, but the present invention is not restricted thereto. Two or more rolls (e.g., three rolls arranged as shown in FIG. 18) are acceptable.

Figure 3:
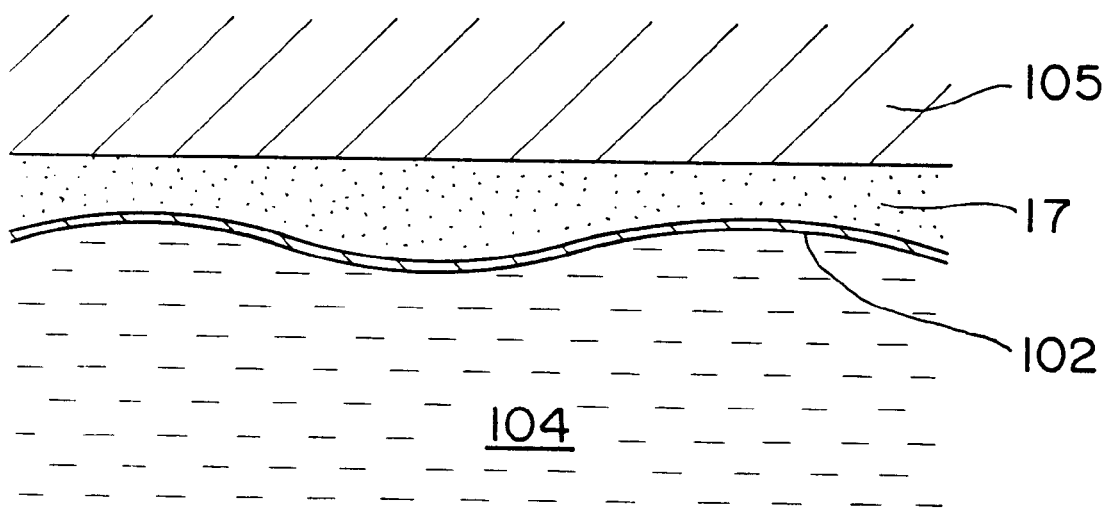
FIG. 3 is a schematic view showing a pinched state during sheet formation concerned with the first embodiment of the present invention.

According to the present invention, as shown in FIGS. 1 and 2, when the melt resin 17 from the extrusion die 12 is pinched using the sheet forming roll 101, the elastic portion of the metallic elastic external cylinder 102 is pressing against the melt resin and deforms in a shape adapted to the shape of the melt resin 17. In this deformed condition, the melt resin 17 is contacted under pressure with the elastic portion (see FIG. 3).

Therefore, no bank is generated during thin sheet formation, as with a conventional elastic roll such as one made of rubber. Furthermore, the surface of the metallic elastic external cylinder 102 is a mirror surface, and is cooled efficiently from inside. Thus, a highly smooth, highly transparent thin sheet 18 can be formed easily with high efficiency.

The thickness of an elastically deformable metal tube for use as a material for the metallic elastic external cylinder 102 in the sheet forming roll 101 of the present invention is preferably about 0.1 to 1.5 mm.

If the thickness of the metal tube is less than 0.1 mm, its strength against the internal pressure will be insufficient. If the thickness is more than 1.5 mm, on the other hand, the degree of elastic deformation will be too low for the metal tube to respond flexibly to the irregularities on the surface of the melt resin during sheet formation.

The material for the metal tube is not restricted, but preferred examples are spring steel, stainless steel, and nickel.

When the metallic elastic external cylinder 102 is provided with a seamless structure without welded seams, a satisfactory sheet can be formed which has no welded seams transferred thereto at the time of pinching the melt resin 17.

When the metallic elastic external cylinder 102 is composed of at least two metallic tubes fitted together, the thickness of each tube can be decreased, thus prolonging life in the presence of repeated deformation.

Figure 10:
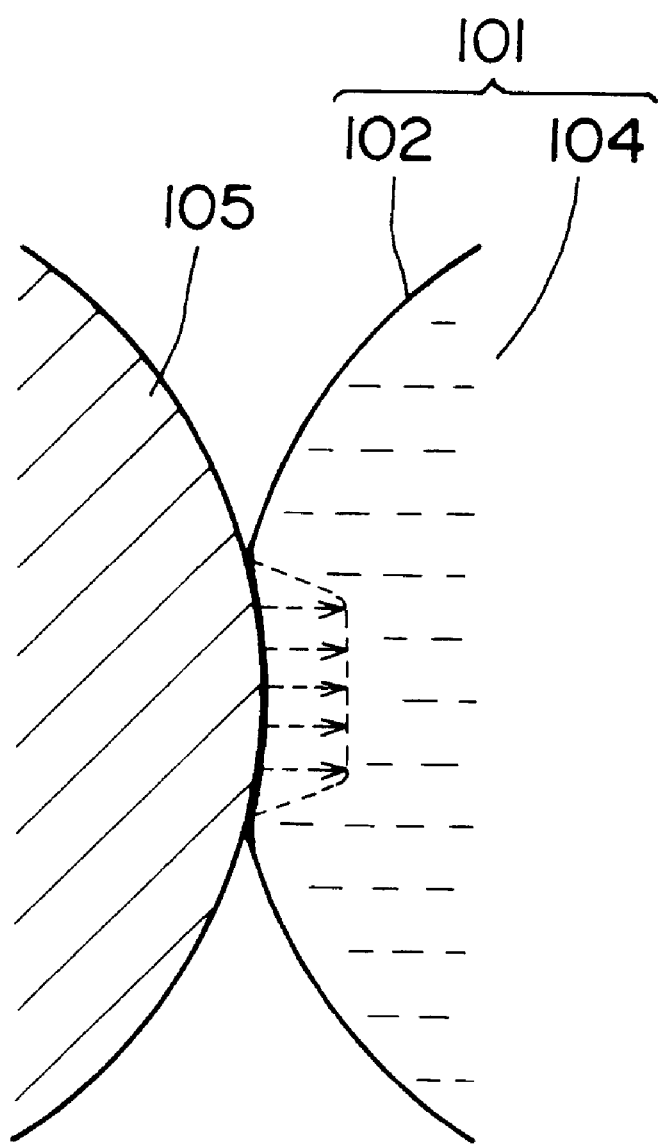
FIG. 10 is a view showing the surface pressure distribution of the sheet forming roll concerned with the present invention.

FIG. 10 is a conceptual view showing the surface pressure distribution of the above-described sheet forming roll according to the present invention.

As shown in FIG. 10, water, the cooling fluid 104 introduced inside, imparts a predetermined pressure to the metallic elastic external cylinder 102.

In the sheet forming roll 101 of the present invention, the metal tube of the metallic elastic external cylinder 102 is elastically deformable, and pressed by the fluid. Thus, a view of the surface pressure distribution of the roll 101 is nearly uniform from the contact start point to the contact end point.

Hence, the range where the roll 101 can be pressed against the melt resin at a predetermined surface pressure is extended, so that smoothness is imparted more uniformly to the surface of the resin sheet.

The sheet forming roll 101 according to the present invention can easily form a highly smooth, highly transparent sheet ranging from a resin sheet as thin as 200 $\mu$m or less to a resin sheet as thick as 300 $\mu$m or more.

The cooling of the metallic elastic external cylinder 102 of the inventive sheet forming roll is performed from inside by circulating the cooling fluid 104 such as cooling water.

That is, the external cylinder of the sheet forming roll is metallic and has a high thermal conductivity, which facilitates its cooling with the cooling fluid 104 from inside. Thus, the surface of the metallic elastic external cylinder, the outer surface of the sheet forming roll, can be always maintained at a predetermined temperature. Even during a continuous operation, the sheet forming roll can form a satisfactory sheet without decreases in the cooling efficiency and cooling effect or declines in the quality and productivity.

With a conventional rubber roll, the elastic force of rubber is characteristic of the material used. When the surface pressure on the sheet is to be varied, therefore, the roll needs to be replaced by a roll of other material different in surface pressure. In the case of the present invention, the pressure of fluid supply is varied by a predetermined amount, whereby the surface pressure on the sheet is varied, lifting the burden of roll replacement as with the conventional roll.

In the present invention, the cooling fluid may be a commonly used coolant such as water or oil.

Supply of the cooling fluid 104 to the inside is carried out, for example, through a supply hole 103a, which has been drilled axially in the shaft center of the shaft portion 103, by means of a fluid pressure feeding means (not shown) provided outside.

The cooling with the coolant is performed at a predetermined pressure. In the present invention, therefore, the metallic elastic external cylinder 102 of the sheet forming roll 101 and the parts of the shaft portion 103 provided at both ends of the metallic elastic external cylinder 102 are in a watertight condition.

In the embodiment illustrated in FIG. 1, an O-ring 106 is disposed circumferentially on the shaft portion 103, and the shaft portion 103 with the O-ring 106 is fitted into the metallic elastic external cylinder 102 for sealing, whereby a watertight condition is kept.

In the instant embodiment, the sheet forming roll 101 is normally dragged by the opposite metallic roll 105 with the melt resin 17 being pinched between these rolls. Alternatively, the shaft portion 103 may be driven separately, whereby the sheet forming roll 101 is rotated at the same speed as that of the opposite metallic roll 105 to pinch the melt resin 17 between the rolls.

As a result, compared with drag by the opposite metallic roll 105, this pinching of the melt resin by the sheet forming roll 101 and the opposite metallic roll 105 driven individually causes little torsion or deformation between the parts in contact with the melt resin and the parts not in contact with the melt resin at both ends of the sheet forming roll 101. Thus, the thickness of the metallic elastic external cylinder 102 can be further reduced, and the inside pressure need not be rendered high. An even more stable thin resin sheet can be formed, and the life of the sheet forming roll 101 is prolonged.

As for the drive means, the metallic roll 105 and the sheet forming roll 101 may be driven by individual drive means, or may be driven by a single drive means via drive transmission means. The rotational speeds of the metallic roll 105 and the sheet forming roll 101 may be suitably adjusted so that both rolls will rotate at nearly the same peripheral speed.

Second Embodiment

The second embodiment of the present invention will be described with reference to FIG. 4.

Figure 4:
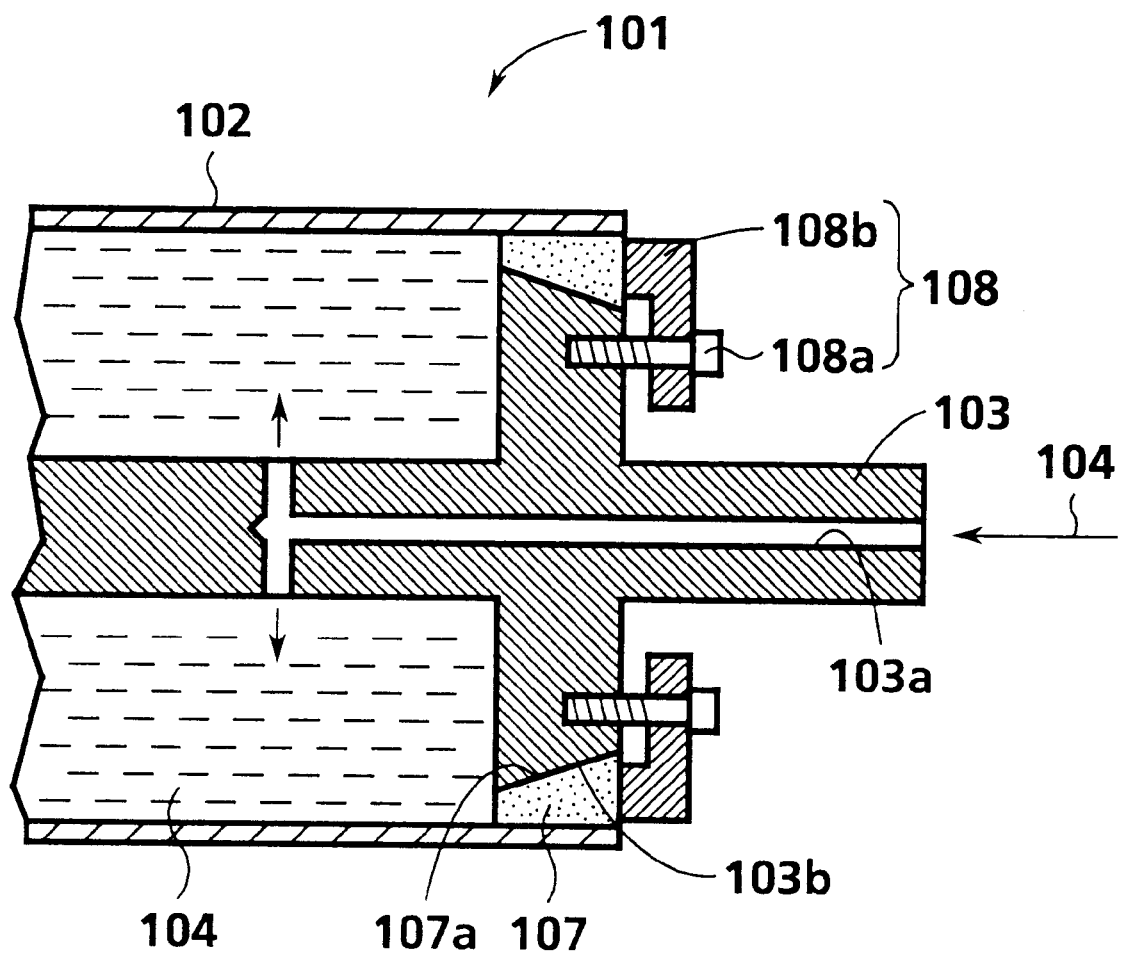
FIG. 4 is a schematic sectional view of a sheet forming roll concerned with a second embodiment of the present invention.

In the instant embodiment, as shown in FIG. 4, a seal member 107 of an elastically deformable shape is used between the shaft portion 103 and the metallic elastic external cylinder 102 to ensure more watertight sealing via tapered surfaces 103b and 107a formed in the shaft portion 103 and the seal member 107, respectively.

The seal member 107 maintains the watertight condition via a securing means 108 consisting of a bolt 108a and a press fitment 108b.

The roll shown in FIG. 4 uses the annular seal member 107 in place of the O-ring 106 of the roll indicated in FIG. 1. Thus, deformation of both ends of the metallic elastic external cylinder 102 is permitted by the seal members 107.

The amount of the deformation becomes uniform in the axial direction, including both ends of the metallic elastic external cylinder 102. Thus, a sheet with better surface smoothness can be formed.

The material for the elastically deformable annular seal member 107 may be any material which maintains the watertight condition and permits the deformation of the external cylinder. Examples are EPDM (ethylene propylene rubber) and neoprene rubber.

Third Embodiment

The third embodiment of the present invention will be described with reference to FIG. 5.

Figure 5:
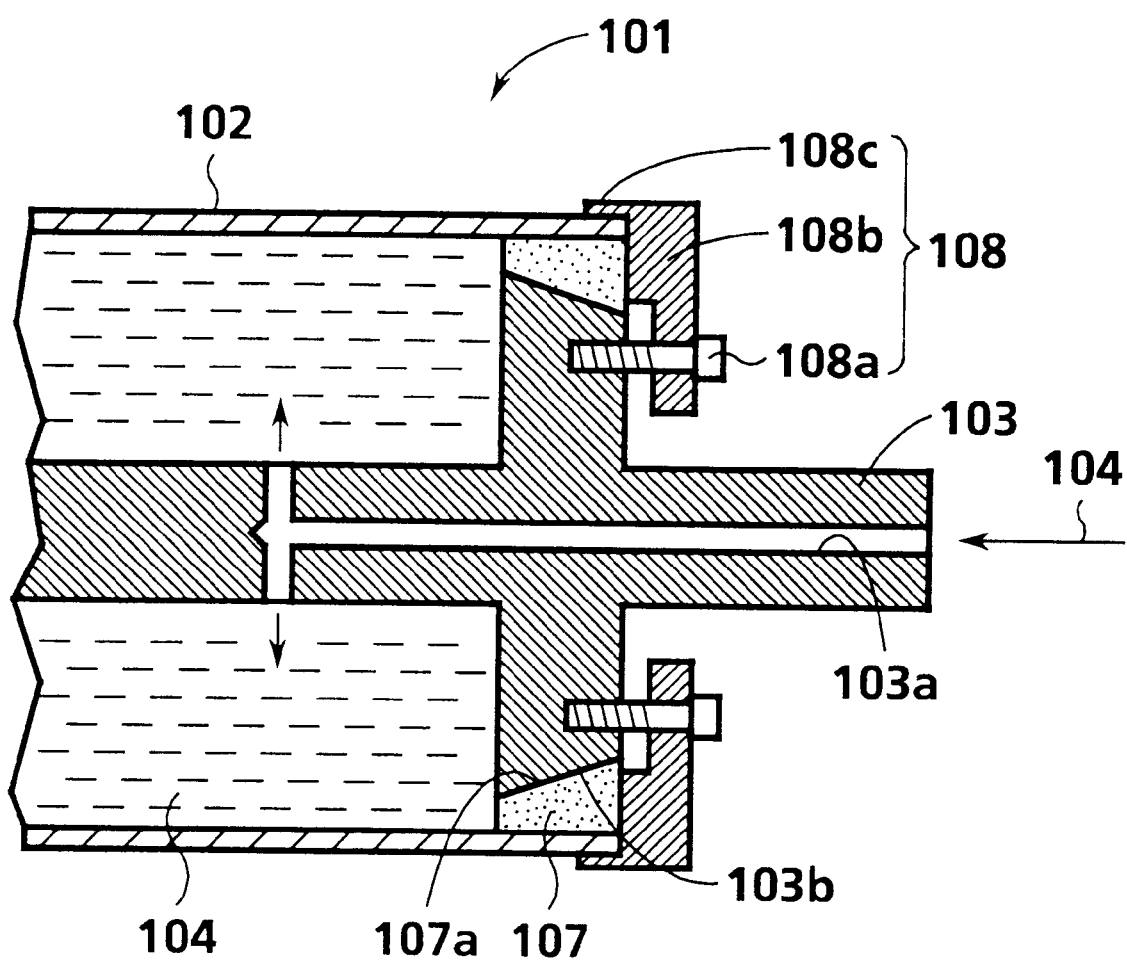
FIG. 5 is a schematic sectional view of a sheet forming roll concerned with a third embodiment of the present invention.

In the instant embodiment, as shown in FIG. 5, a securing means 108 includes the press fitment 108b of the securing means 108 shown in FIG. 4, and a circumferential press portion 108c which presses down the circumference of each end of the metallic elastic external cylinder 102.

Since the circumference of each end of the metallic elastic external cylinder 102 is pressed down thereby, displacement of the metallic elastic external cylinder 102 never occurs.

Fourth Embodiment

The fourth embodiment of the present invention will be described with reference to FIG. 6.

Figure 6:
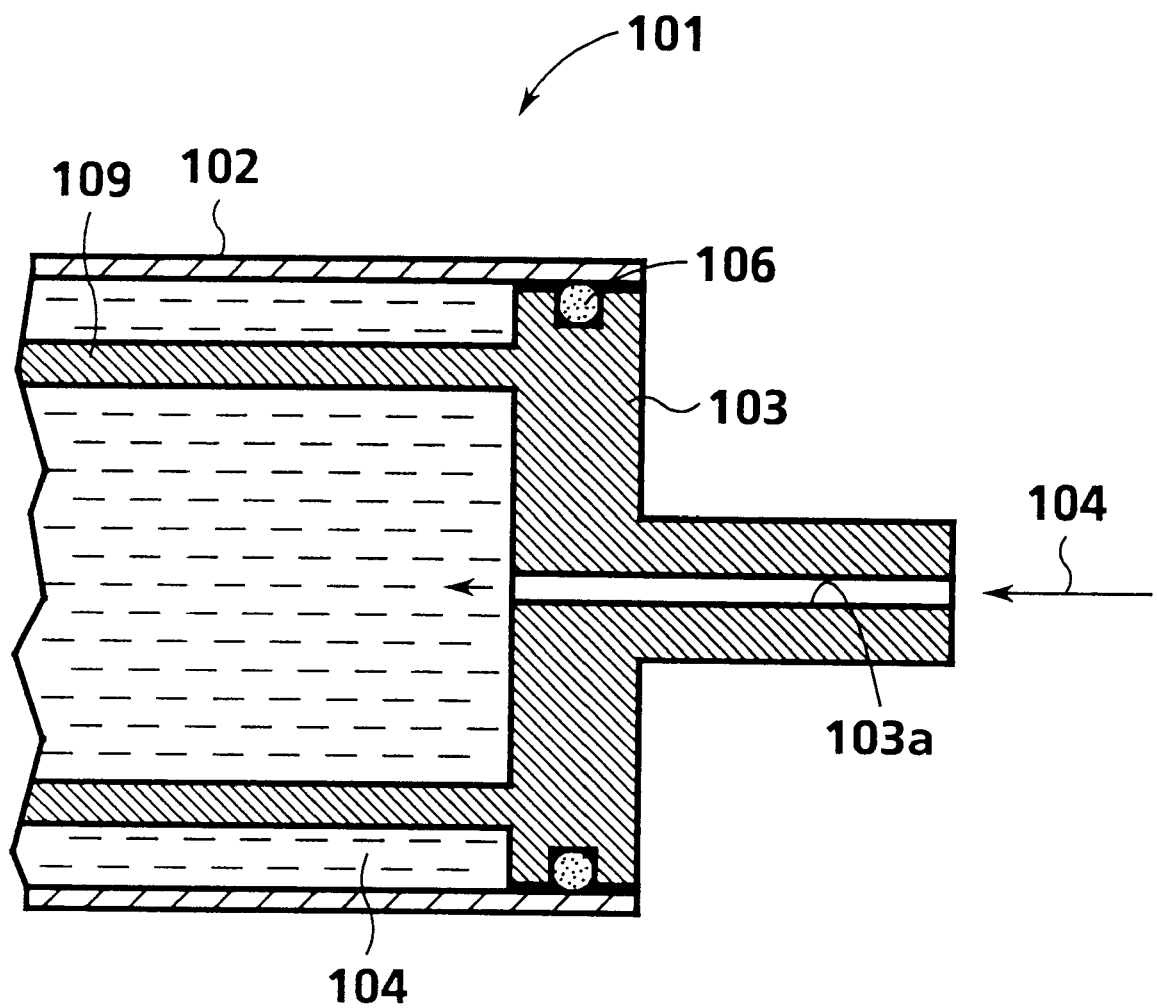
FIG. 6 is a schematic sectional view of a sheet forming roll concerned with a fourth embodiment of the present invention.

In the instant embodiment, as shown in FIG. 6, inside a metallic elastic external cylinder 102 there is disposed an internal cylinder 109 of a smaller outer diameter than the inner diameter of the external cylinder. A cooling fluid 104 is filled under an internal pressure into the space between the internal cylinder 109 and the external cylinder 102. Inside of the internal cylinder 109, a fluid 104a for cooling is fed from outside via a passage 103a. Thus, it is not necessary to provide the aforementioned dedicated fluid pressure feeding means outside.

Thus, the inside of the internal cylinder 109 is only cooled by a separate supply means which supplies a cooling fluid. The internal cylinder 109 is made of a metal, and conducts heat well. Unlike the aforementioned embodiment, a high pressure need not be applied, and only feeding of a cooling fluid is enough.

Fifth Embodiment

The fifth embodiment of the present invention will be described with reference to FIG. 7.

Figure 7:
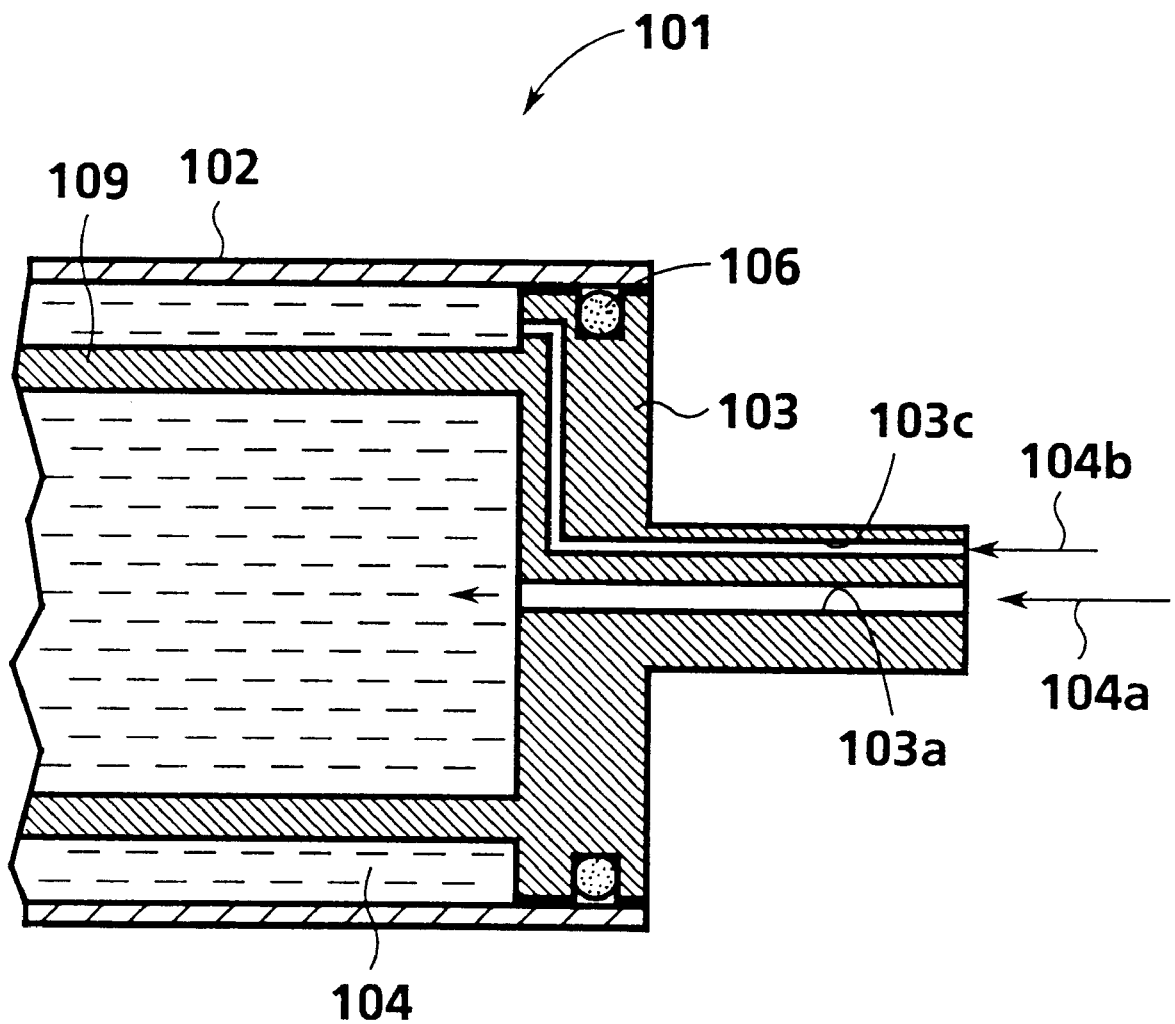
FIG. 7 is a schematic sectional view of a sheet forming roll concerned with a fifth embodiment of the present invention.

In the instant embodiment, as shown in FIG. 7, a fluid is filled under an internal pressure into the space between the external cylinder 102 and the internal cylinder 109. A fluid 104b is pressure fed into the space by an external pressure feeding means via a passage 103c provided in the shaft portion.

When a predetermined internal pressure is to be achieved, the internal pressure of the fluid can be changed via the passage 103c formed in the shaft portion 103 even during an operation.

Sixth Embodiment

The sixth embodiment of the present invention will be described with reference to FIG. 8.

Figure 8:
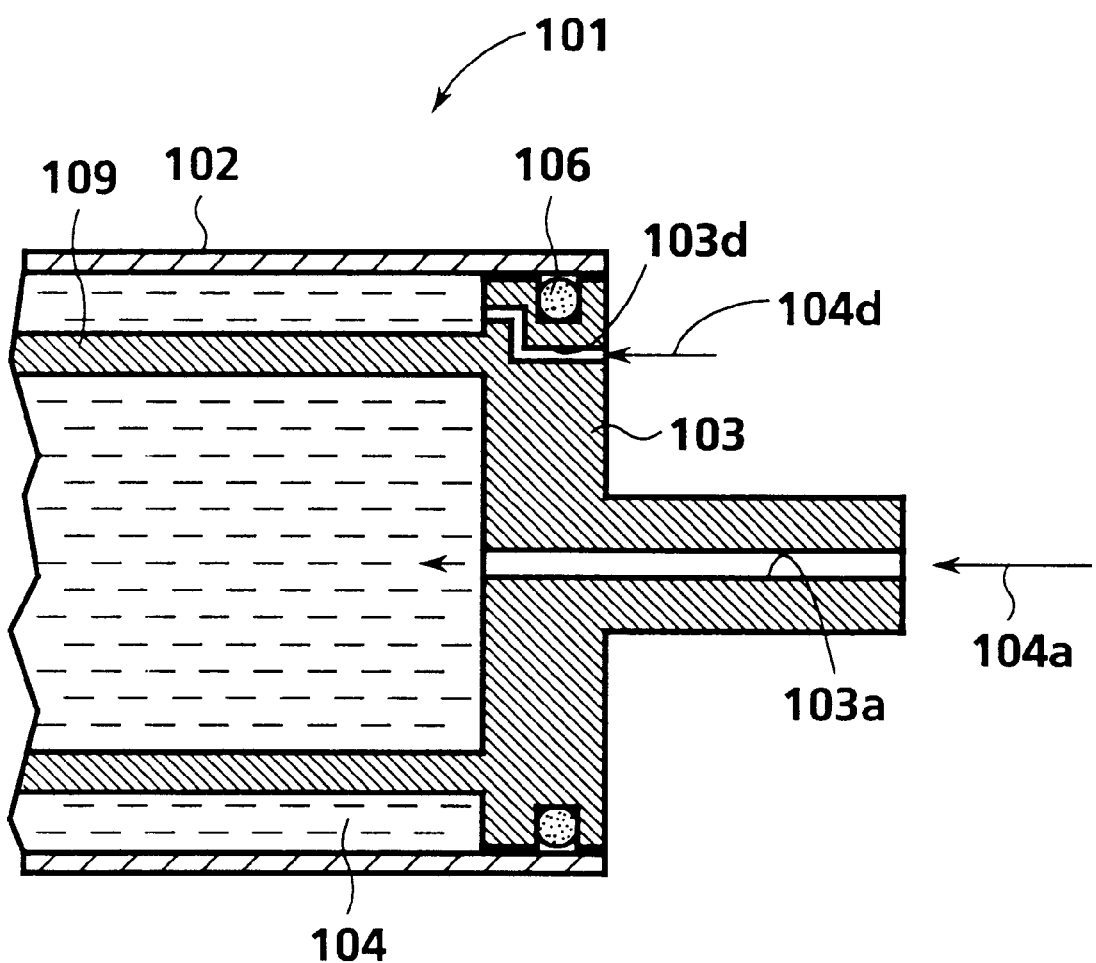
FIG. 8 is a schematic sectional view of a sheet forming roll concerned with a sixth embodiment of the present invention.

In this embodiment, as shown in FIG. 8, the internal pressure need not be changed during an operation. A passage 103d is formed in a side wall of the shaft portion 103, a fluid 104d is pressure fed inside before operation, and the passage 103d is sealed thereafter. In this manner, the structure can be simplified in comparison with the embodiment of FIG. 7.

Seventh Embodiment

The seventh embodiment of the present invention will be described with reference to FIG. 9.

Figure 9:
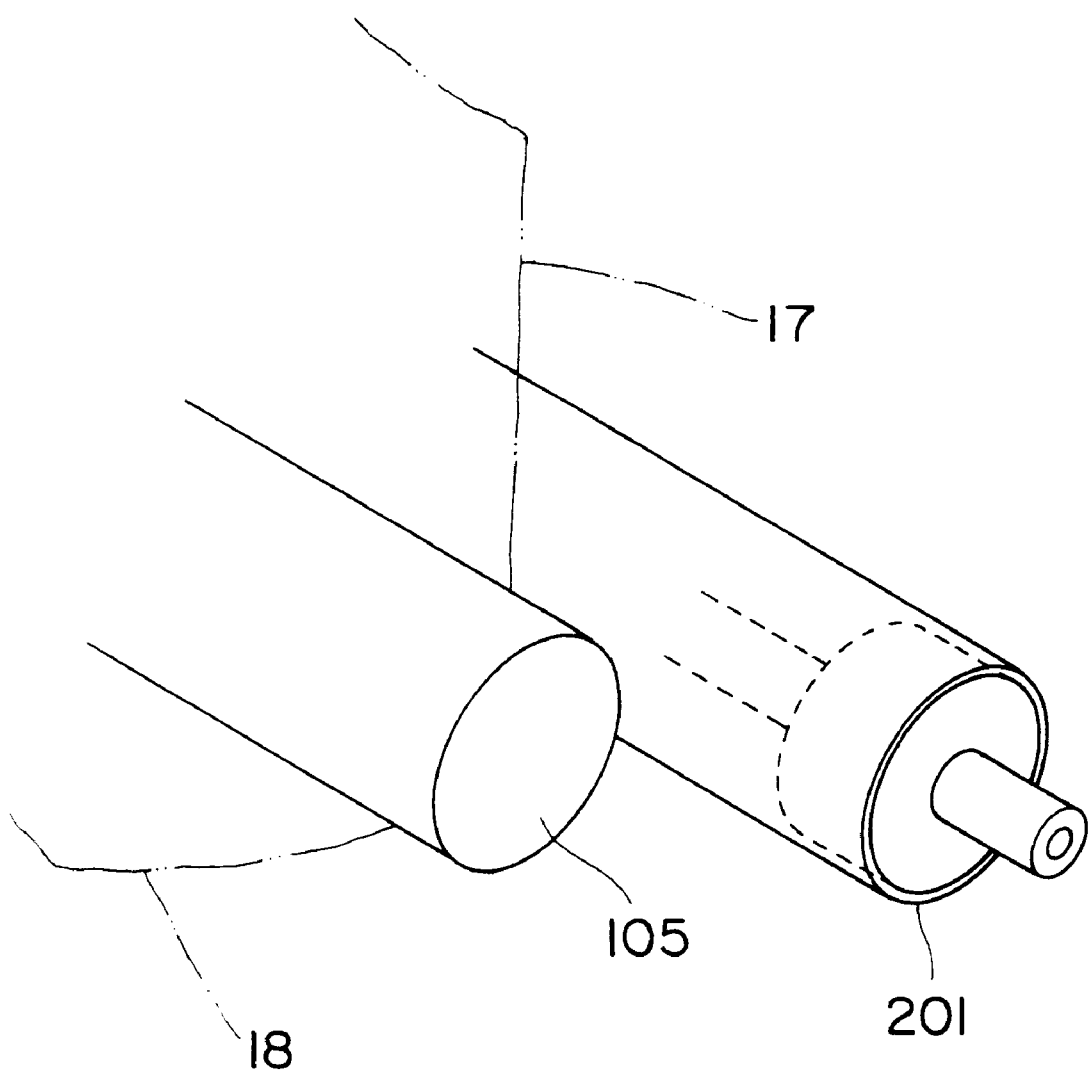
FIG. 9 is a schematic view of an axially elongated sheet forming roll concerned with a seventh embodiment of the present invention and making contact with a metallic roll.

In this embodiment, as shown in FIG. 9, both surfaces of a melt resin 17 extruded from a die of an extruder are pinched between a sheet forming roll 201 and a conventional opposite metallic roll 105. The sheet forming roll 201 is longer in the axial direction than the metallic roll 105 so that the melt resin 17 will not be pinched near the ends of the shafts of both rolls.

Because of this constitution, the pinching pressure on the melt resin 17 becomes more uniform throughout the forming roll 201, thus giving a thin resin sheet having high surface smoothness.

In the embodiment shown in FIG. 9, there may be used a sheet forming roll 101, as illustrated in FIG. 5, which uses a securing means 108 including a circumferential press portion 108c pressing down the circumference of each end of the metallic elastic external cylinder 102 as a securing member 108. This use enables the watertight condition to be retained even in the presence of displacement during operation.

Eighth Embodiment

The eighth embodiment of the present invention will be described with reference to FIG. 11.

Figure 11:
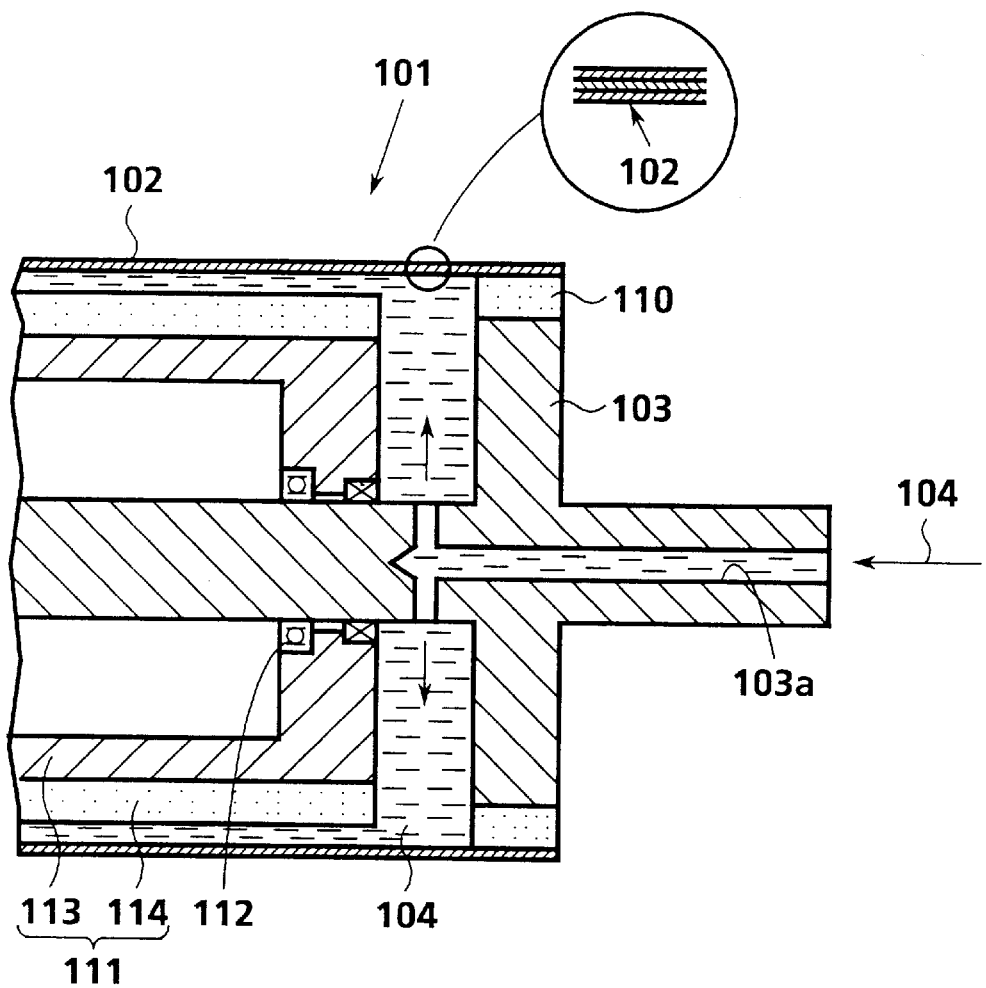
FIG. 11 is a schematic sectional view of a sheet forming roll concerned with an eighth embodiment of the present invention.

FIG. 11 is a schematic view of a sheet forming roll concerned with an eighth embodiment of the present invention for use in the sheet forming machine illustrated in FIG. 18.

The sheet forming roll concerned with the instant embodiment, as shown in FIG. 11, has an elastic roll 111 disposed inside the metallic elastic external cylinder 102 of the sheet forming roll as the first embodiment illustrated in FIG. 1.

That is, a sheet forming roll 101 of the present invention is composed of a metallic elastic external cylinder 102 thick enough to be elastically deformable, a shaft portion 103 for closing both ends of the metallic elastic external cylinder 102, annular seal members 110 capable of elastic deformation provided on the circumference of the shaft portion 103, an elastic roll 111 capable of elastic deformation and rotation provided inside the metallic elastic external cylinder 102, and a cooling fluid supply means (not shown) for supplying a fluid 104 via the shaft portion 103 of the metallic elastic external cylinder 102 into a space defined between the elastic roll 111 and the metallic elastic external cylinder 102.

The elastic roll 111 comprises an elastic material 114 rolled on the surface of a metallic internal cylinder 113 rotatable on the shaft portion 103 via a bearing 112.

Figure 12:
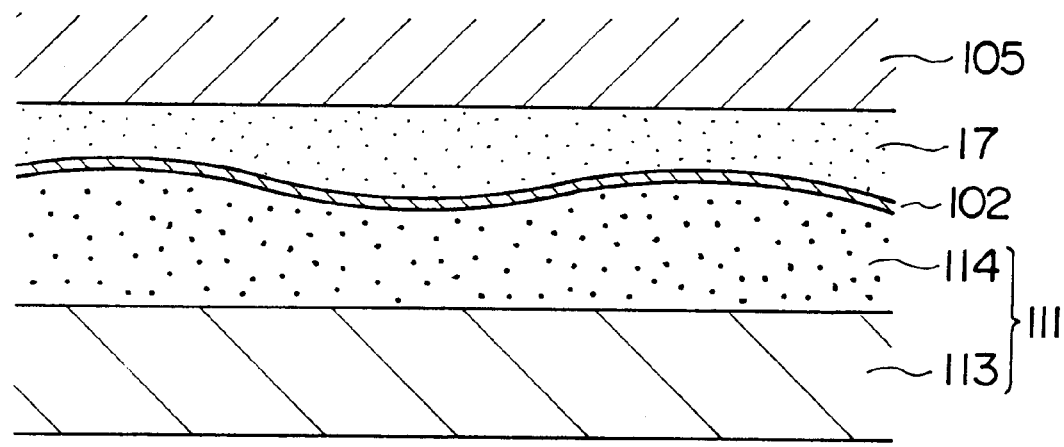
FIG. 12 is a schematic view showing a pinched state during sheet formation concerned with the eighth embodiment of the present invention.

According to the present invention, as shown in FIG. 12, when the melt resin 17 from the extrusion die 12 is pinched using the sheet forming roll 101, this roll 101 exhibits the following behavior: The metallic elastic external cylinder 102 and elastic roll 111 press against the melt resin 17 and deform into a shape adapted to the shape of the melt resin 17, while exerting pressure thereon.

Figure 13:
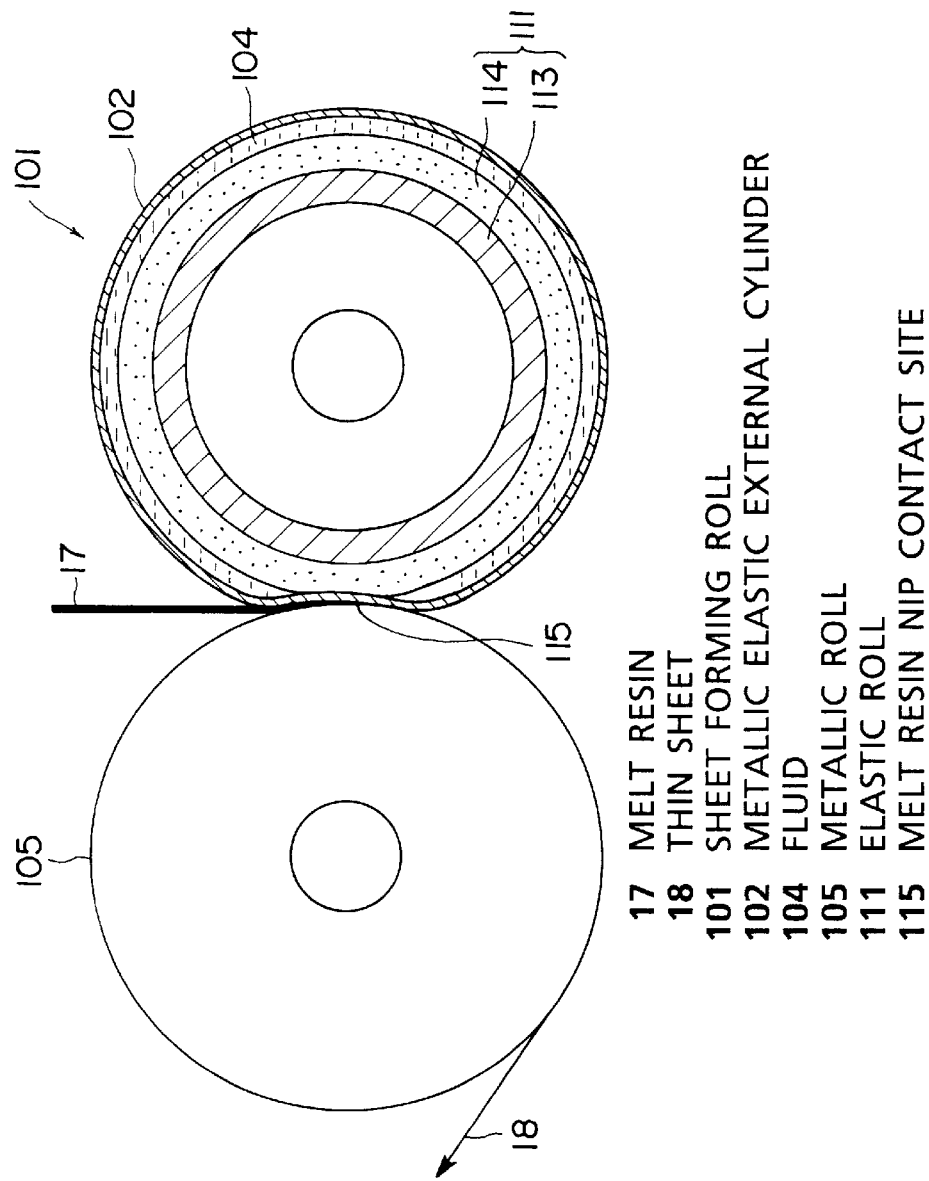
FIG. 13 is a schematic view showing the state of sheet formation concerned with the eighth embodiment of the present invention.

On this occasion, as shown in FIG. 13, the metallic roll 105 and the sheet forming roll 101 are pressed against the melt resin 17 at a melt resin nip contact site 115. In the circumferential direction of the sheet forming roll 101, except for the melt resin nip contact site 115, the metallic elastic external cylinder 102 is cooled efficiently, since the cooling water 104 flows in the space defined between the metallic elastic external cylinder 102 and the elastic roll 111.

At this time, the elastic roll 111 is rotated in a dragged manner together with the metallic elastic external cylinder 102 at the same peripheral speed. However, the rotational speed of the elastic roll 111 is higher than that of the metallic elastic external cylinder 102.

The sheet forming roll 101 relevant to the instant embodiment has the elastic roll 111 disposed inside, thereby retaining a pressing force on the opposite metallic roll 105 when pressing the melt resin 17 with the elastic roll 111. Unlike the sheet forming roll as in the aforementioned first embodiment, therefore, the fluid may flow only for the purpose of cooling, so that the pressure can be lowered further.

Consequently, the fluid pressure feeding means for applying the internal pressure need not be provided outside, and the manufacturing cost for the thin sheet forming roll can be lowered.

As with a conventional elastic roll such as one made of rubber, the sheet forming roll of the instant embodiment is free from the occurrence of a bank mark during the formation of a thin sheet. Furthermore, the surface of the metallic elastic external cylinder 102 is a mirror surface, and cooled efficiently from inside. Thus, a thin sheet 18 with high smoothness and transparency can be formed easily and efficiently.

The external cylinder of the sheet forming roll 101 is preferably of a seamless structure without welded seams.

The elastic material 114 of the elastic roll 111 is not restricted to a particular material. Examples of the material therefor are EPDM (ethylene propylene rubber), neoprene rubber, and silicone rubber. The hardness of the elastic material 114 is preferably 30 to 90° in terms of rubber hardness.

According to the sheet forming roll of the present invention, a very smooth, highly transparent sheet ranging from a resin sheet as thin as 200 $\mu$m or less to a resin sheet as thick as 400 $\mu$m or more can be easily formed.

In the instant embodiment, as shown in a partial enlarged view as FIG. 11, a metallic elastic external cylinder 102 is composed of two or more tubes of metallic material fitted together (in this embodiment, three tubes are fitted together). Compared with a single tube having the same thickness, this composite cylinder has a reduced flexural stress about ⅓ as large, thus prolonging the life of the metallic elastic external cylinder 102 in the presence of repeated deformation. In this case, the thicknesses of the respective tubes may be equal or different.

Ninth Embodiment

The ninth embodiment of the present invention will be described with reference to FIG. 14.

Figure 14:
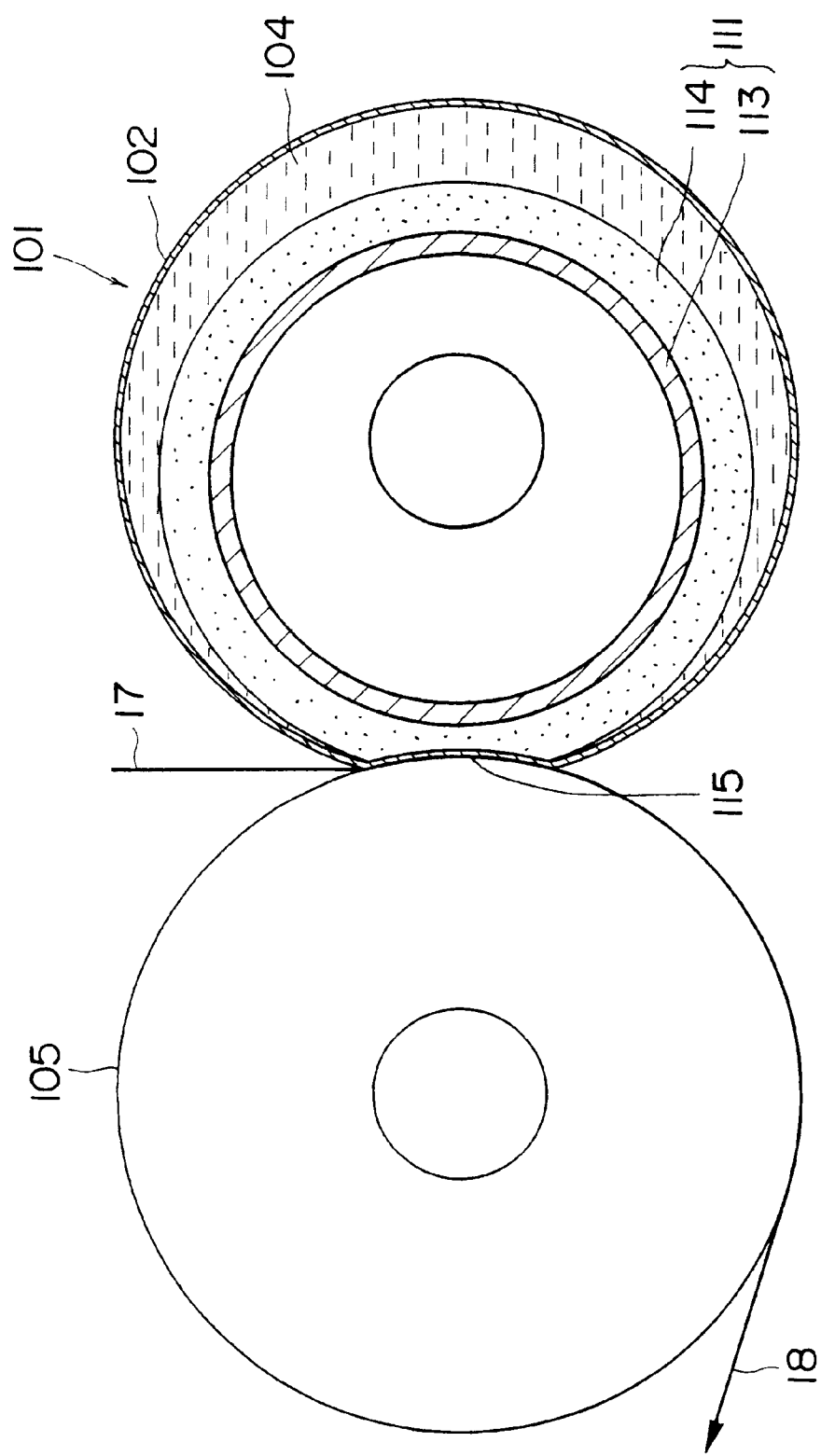
FIG. 14 is a schematic view showing the state of sheet formation concerned with the ninth embodiment of the present invention.

In this embodiment, as shown in FIG. 14, the elastic roll 111 disposed inside the metallic elastic external cylinder 102 in the eighth embodiment is offset toward the opposite metallic roll 105. Thus, compared with the eighth embodiment, the pressing force on the opposite metallic roll 105 is held by the elastic roll 111 when the melt resin 17 is pressed on, without imposing burden on the seal members at both ends of the metallic elastic external cylinder 102. Thus, no burden on the metallic elastic external cylinder 102 is exerted, and still the sealing mechanisms at both ends thereof can be simplified. This results in a decrease in the manufacturing cost for the sheet forming roll.

As described above, the use of the sheet forming roll 101 of the present invention can enable a thin sheet with uniform surface smoothness to be formed easily. According to the present invention, moreover, irregularities are provided on the surface of the metallic elastic external cylinder 102 of the sheet forming roll 101, whereby an arbitrary pattern can be formed on the surface of the thin sheet.

In other embodiments for keeping a watertight condition, the metallic elastic external cylinder 102 and the shaft portion 103 may be bonded together by such a means as welding.

EXAMPLES

Preferred examples of the present invention will be described by reference to the drawings, but the invention is in no way limited thereto.

First Example

Figure 15:
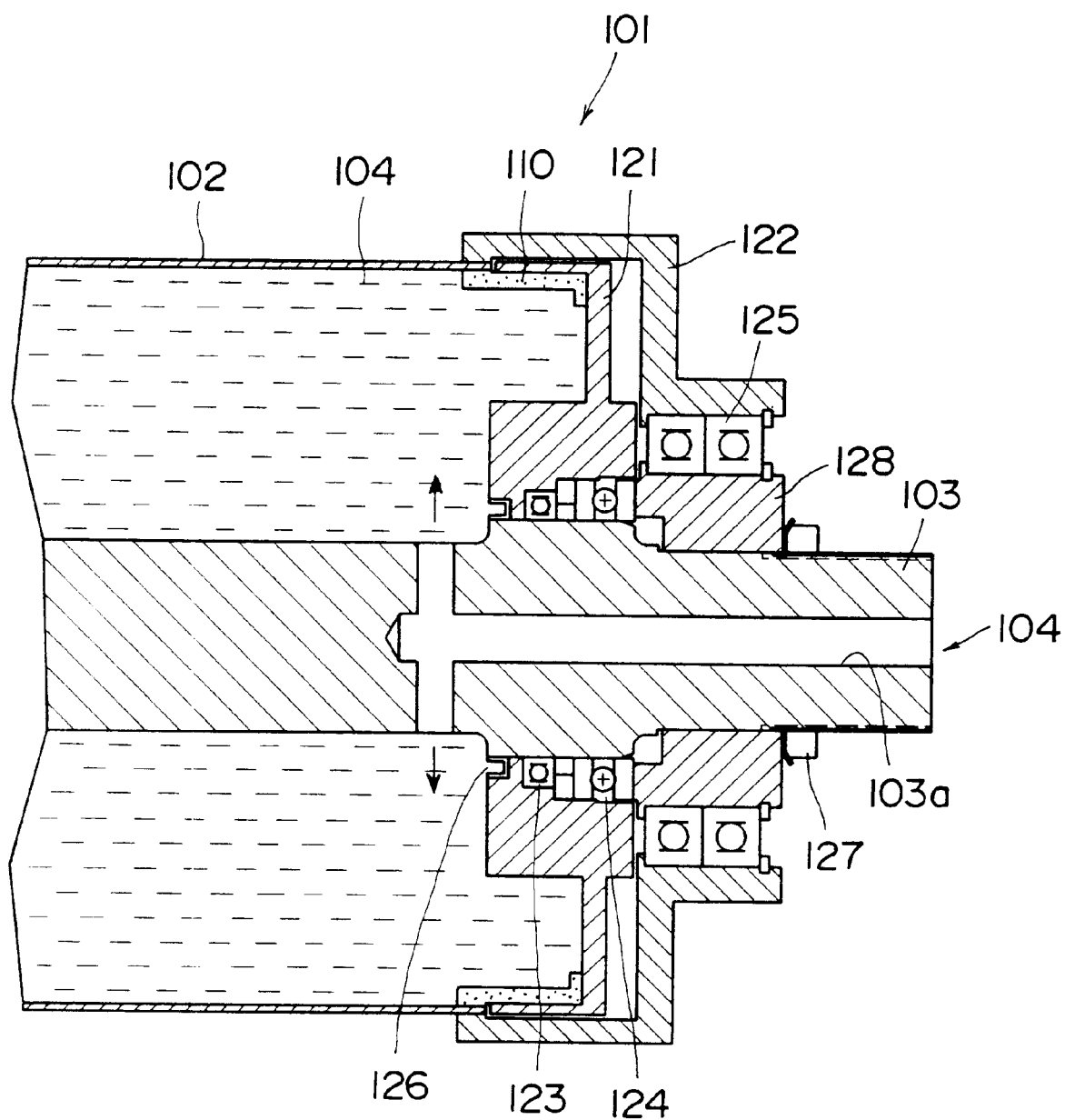
FIG. 15 is a schematic sectional view of a sheet forming roll concerned with a first example of the present invention.

FIG. 15 shows the outline of a sheet forming roll related to the present invention. In FIG. 15, the numeral 101 denotes a sheet forming roll, 102 a metallic elastic external cylinder, 103 a shaft portion, 104 a fluid, 110 an elastic seal member, 121 a first rotary ring, 122 a second rotary ring, 123 a radial bearing, 124 a thrust bearing, 125 a second radial bearing, 126 a rotary seal, 127 a press nut, and 128 a shaft press.

As shown in FIG. 15, the metallic elastic external cylinder 102 and the elastic seal member 110 are joined together using an adhesive. The elastic seal member 110 and the first rotary ring 121 are self-sealed under the hydraulic pressure of water, i.e., a fluid.

Even at the rotational speed of the shaft portion 103 at which the peripheral speed of an opposite metallic roll 105 and the peripheral speed of the metallic elastic external cylinder 102 do not completely agree, the metallic elastic external cylinder 102, the elastic seal member 110 and the first rotary ring 121 rotate integrally without generating any unwanted force.

A tiny difference exists between the outer diameter of the metallic elastic external cylinder 102 and the inner diameter of the fit portion of the second rotary ring 122 that presses the end part of the cylinder from its outer periphery. Thus, a difference in rotational speed arises between the metallic elastic external cylinder 102 and the second rotary ring 122. However, the second rotary ring 122 is free to rotate via the radial bearing 125 provided on the outer periphery of the shaft press 128. Hence, the second rotary ring 122 can rotate independently, imposing no backward force on the metallic elastic external cylinder 102.

The sheet forming roll 101 shown in FIG. 15 was used in a sheet forming machine as illustrated in FIG. 18. A resin, as described below, was charged into an extruder 11, and a melt resin 17 was extruded from a die 12. The extrudate was subjected to the sheet forming roll 101 having the metallic elastic external cylinder 102 complying with the following conditions, and two metallic rolls 14, 15, to obtain a thin sheet 18 with a thickness of 0.2 mm and a width of 1,000 mm:

[Resin]
Homo PP: MER 0.8
[Forming conditions]
Die temperature: 240° C.
[Specifications for the metallic elastic external cylinder]
Outer diameter: 300 mm
Length: 1,200 mm
Thickness of metal foil: 0.4 mm
Temperature of cooling water (inlet): 18° C.
Pressure of cooling water: 5 kg/cm$^2$G The resulting thin sheet was a thin film, but was free from bank marks, as conventionally noted, and was a mirror-surface thin sheet with satisfactory smoothness as was a conventional thick sheet.

Second Example

Figure 16:
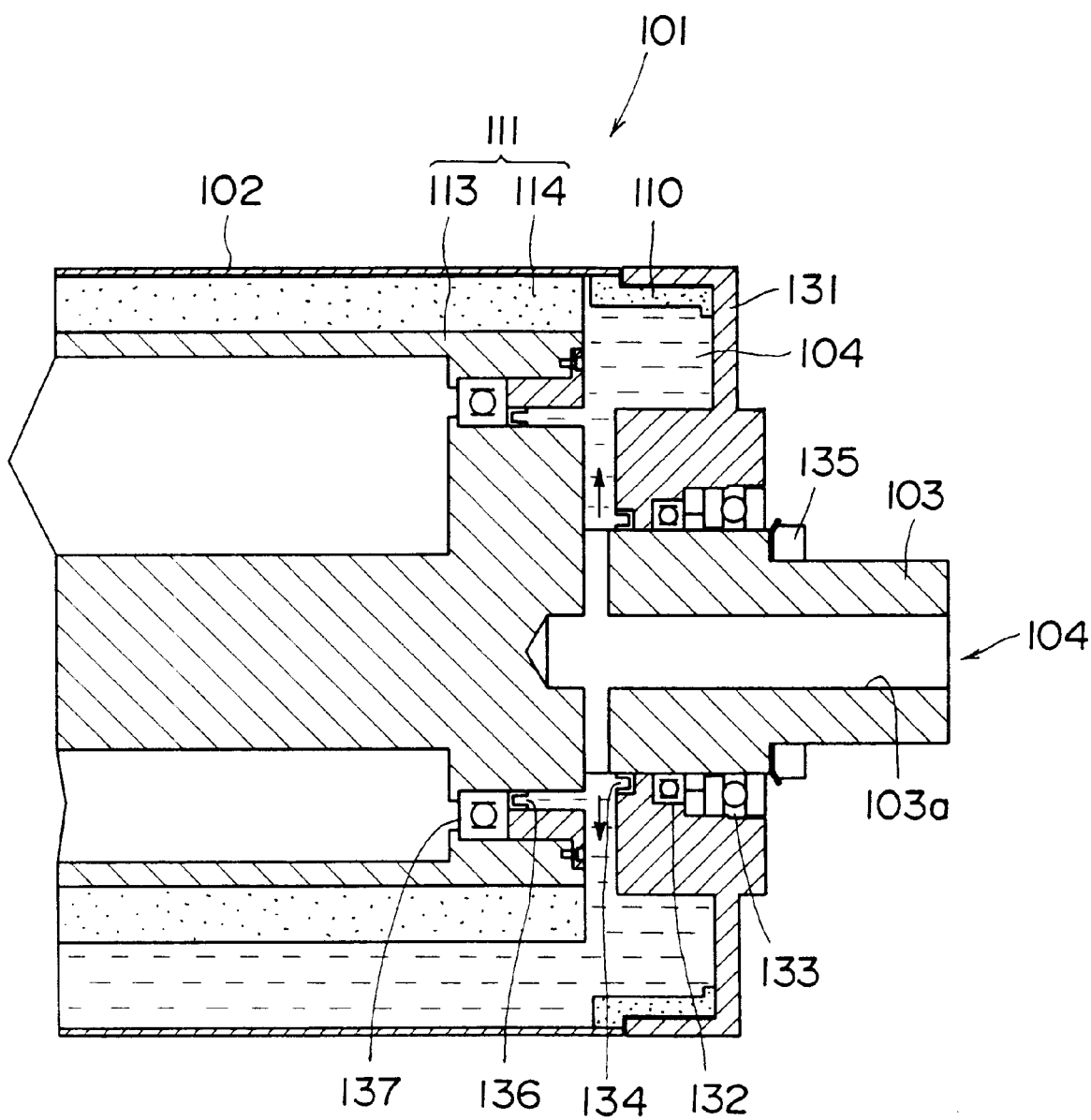
FIG. 16 is a schematic sectional view of a sheet forming roll concerned with a second example of the present invention.
Figure 17:
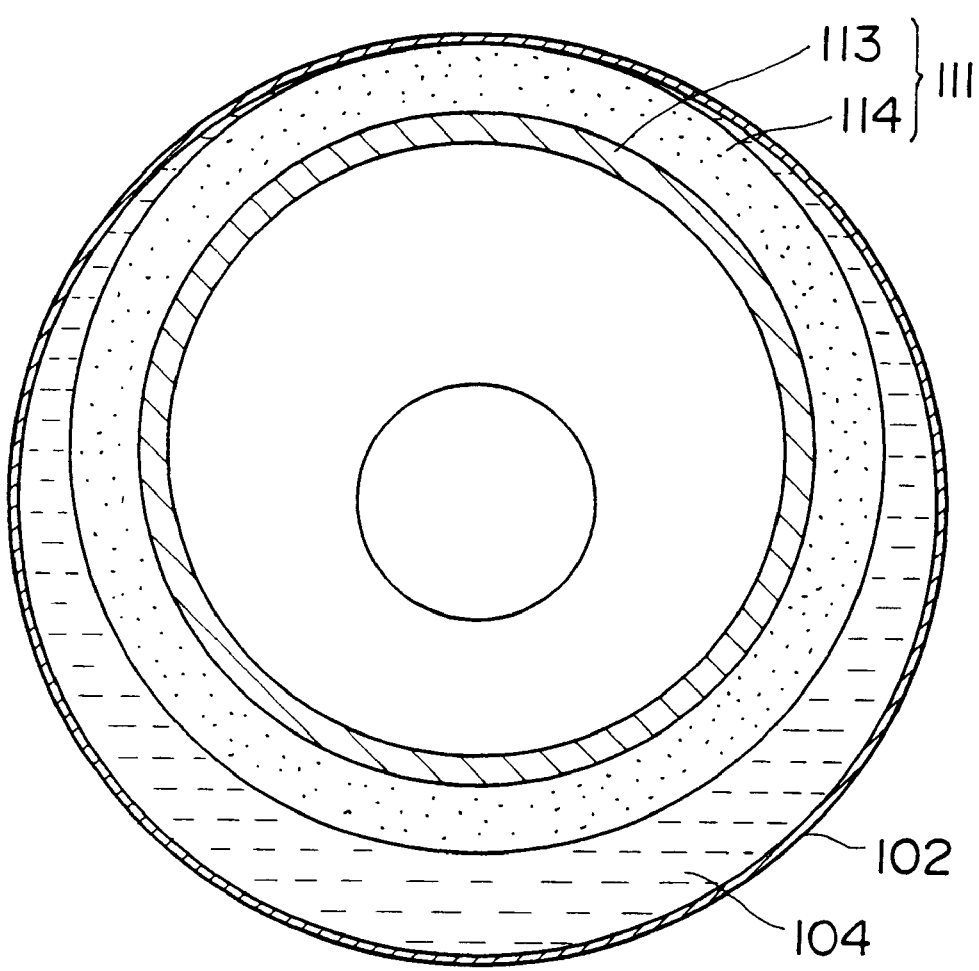
FIG. 17 is another schematic sectional view of a sheet forming roll concerned with the second example of the present invention.

FIGS. 16 and 17 show the outline of a sheet forming roll related to the present invention.

In FIGS. 16 and 17, the numeral 101 denotes a sheet forming roll, 102 a metallic elastic external cylinder, 103 a shaft portion, 104 a fluid, 110 an elastic seal member, 111 an elastic roll, 131 a rotary ring, 132 a radial bearing, 133 a thrust bearing, 134 a rotary seal, 135 a press nut, 137 a radial bearing, and 138 a rotary seal.

As shown in FIGS. 16 and 17, the metallic elastic external cylinder 102 and the elastic seal member 110 are joined together using an adhesive. The elastic seal member 110 and the rotary ring 131 are self-sealed under the hydraulic pressure of water, i.e., a fluid.

The sheet forming roll 101 pressingly contacts a melt resin 17 while pressing the metallic elastic external cylinder 102 against an opposite metallic roll 105 by utilizing the elastic roll 111. Thus, the pressure of water may be one at which the amount of water necessary for cooling flows, and too high a pressure is not required.

The outer diameter of the elastic roll 111 and the inner diameter of the metallic elastic external cylinder 102 make contact at one site. When the sheet forming roll 101 pressingly contacts the metallic roll 105 at this site, therefore, the metallic elastic external cylinder 102 is scarcely displaced in a reverse direction.

In the instant Example, the elastic roll 111 is eccentric with respect to the shaft portion 103, so that the shaft portion 103 does not rotate.

The sheet forming roll 101 shown in FIGS. 16 and 17 was used in a sheet forming machine as illustrated in FIG. 18. A resin as described below was charged into an extruder 11, and a melt resin 17 was extruded from a die 12. The extruded material was subjected to the sheet forming roll 101 having the metallic elastic external cylinder 102 complying with the following conditions, and two metallic rolls 14, 15, to obtain a thin sheet 18 with a thickness of 0.2 mm and a width of 1,000 mm:

[Resin]
Homo PP: MER 0.9
[Forming conditions]
Die temperature: 235° C.
[Specification for the metallic elastic external cylinder]
Outer diameter: 315 mm
Length: 1,200 mm
Thickness of metal foil: 0.2 mm
Temperature of cooling water (inlet): 18° C.
Pressure of cooling water: 2 kg/cm$^2$G The resulting thin sheet was a thin film, but was free from bank marks as conventionally noted, and was a mirror-surface thin sheet with satisfactory smoothness as was a conventional thick sheet. Furthermore, it sufficed to flow water merely for cooling at a low hydraulic pressure. Thus, a fluid pressure feeding means for applying an internal pressure need not be provided outside. As a result, a success in reducing the manufacturing cost for the thin sheet forming roll was achieved.

INDUSTRIAL APPLICABILITY

According to the present invention, a melt resin is pinched using the sheet forming roll having the external cylinder comprising the metal tube capable of elastic deformation. When the melt resin is pinched, the metal tube portion is elastically deformable against the pressure of the cooling fluid. Thus, the external cylinder pressingly contacting the melt resin changes into a shape conformed to the outer diameter of the opposite roll. While so changing in shape, the external cylinder is pressed against the melt resin. Thus, the sheet forming roll is suitable for forming a smooth, mirror-surfaced thin sheet free from bank marks.

Furthermore, a melt resin from a die of an extruder is pinched using the sheet forming roll having the external cylinder comprising the metal tube capable of elastic deformation, and the elastic roll capable of rotation provided inside the external cylinder. When the melt resin is pinched, the metallic elastic external cylinder changes into a shape adapted to the uneven thickness, if any, of the melt resin, because the metal tube of the external cylinder and the elastic roll are elastically deformable. While so changing in shape, the metallic elastic external cylinder is pressed against the melt resin. Thus, the sheet forming roll is suitable for forming a surface-smoothed uniform thin sheet free from bank marks.

I claim:

1. A thin sheet forming roll for forming a thin sheet by pinching a thermoplastic resin between at least two rolls while cooling it, said thin sheet forming roll comprising:

a metallic elastic external cylinder;

a shaft portion for closing both ends of the metallic elastic external cylinder; and an elastic roll capable of elastic deformation and rotation about the shaft portion disposed inside the metallic elastic external cylinder.

2. The thin sheet forming roll of claim 1, wherein annular seal members capable of elastic deformation are provided on the outer periphery of the shaft portion so as to fit into both ends of the metallic elastic external cylinder and over the shaft portion in a watertight condition.

3. The thin sheet forming roll of claim 1, wherein the metallic elastic external cylinder has a seamless structure.

4. The thin sheet forming roll of claim 1, wherein the metallic elastic external cylinder comprises at least two metallic tubes fitted together.

5. The thin sheet forming roll of claim 1, wherein a fluid chamber is defined between the metallic elastic external cylinder and the elastic roll, the shaft portion is provided with a conduit in communication with the fluid chamber, and the thin sheet forming roll further comprises cooling fluid feeding means for feeding the cooling fluid into the fluid chamber via the conduit provided in the shaft portion.

6. A thin sheet forming machine for guiding a melt resin, extruded from a die of an extruder, to at least two metallic rolls, and pinching both surfaces of the melt resin between the surfaces of the rolls, while cooling the melt resin, to form a thin sheet; wherein at least one of the metallic rolls is a thin sheet forming roll comprising:

a metallic elastic external cylinder comprising a metal tube capable of elastic deformation;

a shaft portion for closing both ends of the metallic elastic external cylinder; and an elastic roll capable of elastic deformation and rotation about the shaft portion disposed inside the metallic elastic external cylinder.

7. The thin sheet forming machine of claim 6, wherein the thin sheet forming roll is longer in an axial direction than an opposed metallic roll.

8. The thin sheet forming machine of claim 7, wherein the sheet forming roll and the opposed metallic roll are driven by drive means to pinch the melt resin therebetween, while cooling it, to form a mirror-surfaced thin sheet.

* * * * *